(12) United States Patent
Taniguchi

(10) Patent No.: US 6,928,282 B2
(45) Date of Patent: Aug. 9, 2005

(54) MOBILE IP NETWORK SYSTEM

(75) Inventor: Makoto Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 467 days.

(21) Appl. No.: 10/033,558

(22) Filed: Dec. 27, 2001

(65) Prior Publication Data

US 2003/0045287 A1 Mar. 6, 2003

(30) Foreign Application Priority Data

Aug. 29, 2001 (JP) .......................................... 2001-259526

(51) Int. Cl.$^7$ ............................ H04Q 7/20; H04Q 7/00; G06F 15/173; H04L 12/56
(52) U.S. Cl. ..................... 455/433; 455/435.1; 709/223; 709/226; 709/227; 709/238; 709/245; 370/331; 370/401; 370/254
(58) Field of Search ........................... 455/435.1, 435.2, 455/435.3, 432.1, 433, 512, 527, 436, 560, 561; 709/245, 238, 223, 226, 227; 370/331, 401, 254; 719/317; 713/150

(56) References Cited

U.S. PATENT DOCUMENTS

| | | | | | |
|---|---|---|---|---|---|
| 5,546,594 | A | * | 8/1996 | Wazumi | ...................... 719/317 |
| 5,666,364 | A | * | 9/1997 | Pierce et al. | ................. 370/455 |
| 6,009,103 | A | * | 12/1999 | Woundy | ...................... 370/401 |
| 6,061,559 | A | * | 5/2000 | Eriksson et al. | .......... 455/435.3 |
| 6,070,087 | A | * | 5/2000 | Aoshima | ...................... 455/525 |
| 6,324,577 | B1 | * | 11/2001 | Hirai | ............................ 709/223 |
| 6,356,767 | B2 | * | 3/2002 | Froula | .......................... 455/512 |
| 6,393,484 | B1 | * | 5/2002 | Massarani | .................... 709/227 |
| 6,427,170 | B1 | * | 7/2002 | Sitaraman et al. | ........... 709/226 |
| 6,487,605 | B1 | * | 11/2002 | Leung | .......................... 709/245 |
| 6,515,974 | B1 | * | 2/2003 | Inoue et al. | ................. 370/331 |
| 6,754,492 | B1 | * | 6/2004 | Stammers et al. | ........ 455/435.1 |
| 6,856,602 | B1 | * | 2/2005 | Westberg | ..................... 370/254 |
| 2003/0088765 | A1 | * | 5/2003 | Eschbach et al. | ............ 713/150 |
| 2004/0024901 | A1 | * | 2/2004 | Agrawal et al. | ............. 709/238 |

FOREIGN PATENT DOCUMENTS

JP          08194657        7/1996

* cited by examiner

*Primary Examiner*—William Trost
*Assistant Examiner*—Kiet Doan
(74) *Attorney, Agent, or Firm*—Katten Muchin Zavis Rosenman

(57) ABSTRACT

A home agent provides mobility transparent communications to a mobile node temporarily connected to a second network as a mobile destination different from a first network normally utilized. The home agent includes a module receiving a new registration request from the mobile node via the second network, a module detecting, when receiving the new registration request, that lease addresses of a DHCP server and addresses pooled beforehand are all occupied, and a module searching for, when detecting that all the addresses are occupied, an address on the basis of self-managed information and allocating the searched address to the mobile node.

17 Claims, 24 Drawing Sheets

FIG. 3A

| USER IDENTIFIER(MN-NAI) | USER PRIORITY |
|---|---|
| aaa1 | PRIORITY A |
| aaa2 | PRIORITY A |
| aaa3 | PRIORITY A |
| aaa4 | PRIORITY A |
| aaa5 | PRIORITY A |
| bbb1 | PRIORITY B |
| bbb2 | PRIORITY B |
| bbb3 | PRIORITY B |
| bbb4 | PRIORITY B |
| bbb5 | PRIORITY B |
| bbb6 | PRIORITY B |
| bbb7 | PRIORITY B |
| bbb8 | PRIORITY B |
| bbb9 | PRIORITY B |
| bbb10 | PRIORITY B |

| ADDRESS | ACTIVE USER IDENTIFIER(MN-NAI) | ACTIVE USER PRIORITY |
|---|---|---|
| aaa.aaa.aaa.aaa1 | | |
| aaa.aaa.aaa.aaa2 | | |
| aaa.aaa.aaa.aaa3 | | |

| ADDRESS | OPEN TIME | FORCED DELETE RANK |
|---|---|---|

| ACTIVE USER IDENTIFIER(MN-NAI) | ACTIVE ADDRESS | ACTIVE USER PRIORITY |
|---|---|---|

180

*1: ASSUMING THAT 15 USERS (PRIORITY-A USERS: aaa1-aaa5, PRIORITY-B USERS: bbb1-bbb10) ARE REGISTERED IN HA
*2: FIVE PRIORITY-A USERS ARE REGISTERED, AND IT IS THEREFORE ASSUMED THAT HA ACQUIRES IP ADDRESSES FOR 3 PRIORITY-A USERS BEFOREHAND

FIG. 4A

| USER IDENTIFIER(MN-NAI) | USER PRIORITY |
|---|---|
| aaa1 | PRIORITY A |
| aaa2 | PRIORITY A |
| aaa3 | PRIORITY A |
| aaa4 | PRIORITY A |
| aaa5 | PRIORITY A |
| bbb1 | PRIORITY B |
| bbb2 | PRIORITY B |
| bbb3 | PRIORITY B |
| bbb4 | PRIORITY B |
| bbb5 | PRIORITY B |
| bbb6 | PRIORITY B |
| bbb7 | PRIORITY B |
| bbb8 | PRIORITY B |
| bbb9 | PRIORITY B |
| bbb10 | PRIORITY B |

FIG. 4B

| ADDRESS | ACTIVE USER IDENTIFIER(MN-NAI) | ACTIVE USER PRIORITY |
|---|---|---|
| aaa.aaa.aaa.aa1 | aaa1 | PRIORITY A |
| aaa.aaa.aaa.aa2 | | |
| aaa.aaa.aaa.aa3 | | |

| ADDRESS | OPEN TIME | FORCED DELETE RANK |
|---|---|---|

| ACTIVE USER IDENTIFIER(MN-NAI) | ACTIVE ADDRESS | ACTIVE USER PRIORITY LIST |
|---|---|---|
| aaa1 | aaa.aaa.aaa.aa1 | PRIORITY A |

— 180

*1: USER aaa1 IS GIVEN PRIORITY-A AND THEREFORE USES IP ADDRESS REGISTERED IN PRIORITY ADDRESS DATABASE
*2: STATUS THAT USER aaa1 IS ACTIVE IS ADMINISTERED

FIG. 5A

| USER IDENTIFIER(MN-NAI) | USER PRIORITY |
|---|---|
| aaa1 | PRIORITY A |
| aaa2 | PRIORITY A |
| aaa3 | PRIORITY A |
| aaa4 | PRIORITY A |
| aaa5 | PRIORITY A |
| bbb1 | PRIORITY B |
| bbb2 | PRIORITY B |
| bbb3 | PRIORITY B |
| bbb4 | PRIORITY B |
| bbb5 | PRIORITY B |
| bbb6 | PRIORITY B |
| bbb7 | PRIORITY B |
| bbb8 | PRIORITY B |
| bbb9 | PRIORITY B |
| bbb10 | PRIORITY B |

| ADDRESS | ACTIVE USER IDENTIFIER(MN-NAI) | ACTIVE USER PRIORITY |
|---|---|---|
| aaa.aaa.aaa.aa1 | aaa1 | PRIORITY A |
| aaa.aaa.aaa.aa2 | | |
| aaa.aaa.aaa.aa3 | | |

| ADDRESS | OPEN TIME | FORCED DELETE RANK |
|---|---|---|

| ACTIVE USER IDENTIFIER(MN-NAI) | ACTIVE ADDRESS | ACTIVE USER PRIORITY | LT |
|---|---|---|---|
| aaa1 | aaa.aaa.aaa.aa1 | PRIORITY A | |
| bbb1 | bbb.bbb.bbb.bb1 | PRIORITY B | x1 |

180

*1: USER bbb1 IS GIVEN PRIORITY B AND THEREFORE OBTAINS IP ADDRESS (bbb.bbb.bbb.bb1) FROM DHCP SERVER
*2: STATUS THAT USERS aaa1 AND bbb1 ARE ACTIVE IS ADMINISTERED

FIG. 6A

| USER IDENTIFIER(MN-NAI) | USER PRIORITY |
|---|---|
| aaa1 | PRIORITY A |
| aaa2 | PRIORITY A |
| aaa3 | PRIORITY A |
| aaa4 | PRIORITY A |
| aaa5 | PRIORITY A |
| bbb1 | PRIORITY B |
| bbb2 | PRIORITY B |
| bbb3 | PRIORITY B |
| bbb4 | PRIORITY B |
| bbb5 | PRIORITY B |
| bbb6 | PRIORITY B |
| bbb7 | PRIORITY B |
| bbb8 | PRIORITY B |
| bbb9 | PRIORITY B |
| bbb10 | PRIORITY B |

FIG. 6B

| ADDRESS | ACTIVE USER IDENTIFIER(MN-NAI) | ACTIVE USER PRIORITY |
|---|---|---|
| aaa.aaa.aaa.aa1 | aaa1 | PRIORITY A |
| aaa.aaa.aaa.aa2 | | |
| aaa.aaa.aaa.aa3 | | |

| ADDRESS | OPEN TIME | FORCED DELETE RANK |
|---|---|---|
| bbb.bbb.bbb.bb1 | t | |

170

*1: bbb1 IS DELETED FROM MOBILE BINDING LIST
*2: IP ADDRESS USED BY bbb1 IS MANAGED WITHIN TIME t IN OPEN ADDRESS DATABASE

FIG. 6D

| ACTIVE USER IDENTIFIER(MN-NAI) | ACTIVE ADDRESS | ACTIVE USER PRIORITY |
|---|---|---|
| aaa1 | aaa.aaa.aaa.aa1 | PRIORITY A |

| USER IDENTIFIER(MN-NAI) | USER PRIORITY |
|---|---|
| aaa1 | PRIORITY A |
| aaa2 | PRIORITY A |
| aaa3 | PRIORITY A |
| aaa4 | PRIORITY A |
| aaa5 | PRIORITY A |
| bbb1 | PRIORITY B |
| bbb2 | PRIORITY B |
| bbb3 | PRIORITY B |
| bbb4 | PRIORITY B |
| bbb5 | PRIORITY B |
| bbb6 | PRIORITY B |
| bbb7 | PRIORITY B |
| bbb8 | PRIORITY B |
| bbb9 | PRIORITY B |
| bbb10 | PRIORITY B |

| ADDRESS | ACTIVE USER IDENTIFIER(MN-NAI) | ACTIVE USER PRIORITY |
|---|---|---|
| aaa.aaa.aaa.aa1 | aaa1 | PRIORITY A |
| aaa.aaa.aaa.aa2 | | |
| aaa.aaa.aaa.aa3 | | |

| ADDRESS | OPEN TIME | FORCED DELETE RANK |
|---|---|---|

| ACTIVE USER IDENTIFIER(MN-NAI) | ACTIVE ADDRESS | ACTIVE USER PRIORITY |
|---|---|---|
| aaa1 | aaa.aaa.aaa.aa1 | PRIORITY A |
| bbb2 | bbb.bbb.bbb.bb1 | PRIORITY B |

180

*1: STATUS THAT aaa1 AND bbb2 ARE ACTIVE IS ADMINISTERED
*2: IP ADDRESS USED BY bbb1 IS REUSED BY bbb2 (IP ADDRESS bbb1 IS OBTAINED NOT FROM DHCP SERVER BUT FROM OPEN ADDRESS DATABASE)

FIG. 8A

| USER IDENTIFIER(MN-NAI) | USER PRIORITY |
|---|---|
| aaa1 | PRIORITY A |
| aaa2 | PRIORITY A |
| aaa3 | PRIORITY A |
| aaa4 | PRIORITY A |
| aaa5 | PRIORITY A |
| bbb1 | PRIORITY B |
| bbb2 | PRIORITY B |
| bbb3 | PRIORITY B |
| bbb4 | PRIORITY B |
| bbb5 | PRIORITY B |
| bbb6 | PRIORITY B |
| bbb7 | PRIORITY B |
| bbb8 | PRIORITY B |
| bbb9 | PRIORITY B |
| bbb10 | PRIORITY B |

FIG. 8B

| ADDRESS | ACTIVE USER IDENTIFIER (MN-NAI) | ACTIVE USER PRIORITY |
|---|---|---|
| aaa.aaa.aaa.aa1 | aaa1 | PRIORITY A |
| aaa.aaa.aaa.aa2 | | |
| aaa.aaa.aaa.aa3 | | |

| ADDRESS | OPEN TIME | FORCED DELETE RANK |
|---|---|---|

170

*1: ADDRESS bbb.bbb.bbb.bb1 IS MADE OPEN

FIG. 8D

| ACTIVE USER IDENTIFIER (MN-NAI) | ACTIVE ADDRESS | ACTIVE USER PRIORITY |
|---|---|---|
| aaa1 | aaa.aaa.aaa.aa1 | PRIORITY A |

| USER IDENTIFIER(MN-NAI) | USER PRIORITY |
|---|---|
| aaa1 | PRIORITY A |
| aaa2 | PRIORITY A |
| aaa3 | PRIORITY A |
| aaa4 | PRIORITY A |
| aaa5 | PRIORITY A |
| bbb1 | PRIORITY B |
| bbb2 | PRIORITY B |
| bbb3 | PRIORITY B |
| bbb4 | PRIORITY B |
| bbb5 | PRIORITY B |
| bbb6 | PRIORITY B |
| bbb7 | PRIORITY B |
| bbb8 | PRIORITY B |
| bbb9 | PRIORITY B |
| bbb10 | PRIORITY B |

FIG. 9B

| ADDRESS | ACTIVE USER IDENTIFIER(MN-NAI) | ACTIVE USER PRIORITY |
|---|---|---|
| aaa.aaa.aaa.aa1 | aaa1 | PRIORITY A |
| aaa.aaa.aaa.aa2 | aaa5 | PRIORITY A |
| aaa.aaa.aaa.aa3 | aaa4 | PRIORITY A |

| ADDRESS | OPEN TIME | FORCED DELETE RANK |
|---|---|---|

| ACTIVE USER IDENTIFIER(MN-NAI) | ACTIVE ADDRESS | ACTIVE USER PRIORITY |
|---|---|---|
| aaa1 | aaa.aaa.aaa.aa1 | PRIORITY A |
| aaa5 | aaa.aaa.aaa.aa2 | PRIORITY A |
| aaa4 | aaa.aaa.aaa.aa3 | PRIORITY A |
| aaa2 | bbb.bbb.bbb.bb1 | PRIORITY A |
| aaa3 | bbb.bbb.bbb.bb2 | PRIORITY A |

180

*1: USER USING PRIORITY ADDRESS IS ADMINISTERED
*2: ADDRESSES bbb.bbb.bbb.bb1/bbb.bbb.bbb.bb2 ARE IP ADDRESSES OBTAINED FROM DHCP SERVER
*3: STATUS THAT USERS aaa1 - aaa5 ARE ACTIVE IS ADMINISTERED

FIG. 10A

| USER IDENTIFIER(MN-NAI) | USER PRIORITY |
|---|---|
| aaa1 | PRIORITY A |
| aaa2 | PRIORITY A |
| aaa3 | PRIORITY A |
| aaa4 | PRIORITY A |
| aaa5 | PRIORITY A |
| bbb1 | PRIORITY B |
| bbb2 | PRIORITY B |
| bbb3 | PRIORITY B |
| bbb4 | PRIORITY B |
| bbb5 | PRIORITY B |
| bbb6 | PRIORITY B |
| bbb7 | PRIORITY B |
| bbb8 | PRIORITY B |
| bbb9 | PRIORITY B |
| bbb10 | PRIORITY B |

FIG. 10B

| ADDRESS | ACTIVE USER IDENTIFIER(MN-NAI) | ACTIVE USER PRIORITY |
|---|---|---|
| aaa.aaa.aaa.aa1 | | |
| aaa.aaa.aaa.aa2 | | |
| aaa.aaa.aaa.aa3 | | |

| ADDRESS | OPEN TIME | FORCED DELETE RANK |
|---|---|---|
| bbb.bbb.bbb.bb1 | t | |
| bbb.bbb.bbb.bb2 | t | |

170

*1: ACTIVE USER IS DELETED FROM MOBILE BINDING LIST
*2: NO ACTIVE USER IN PRIORITY ADDRESS DATABASE
*3: ADDRESS OBTAINED FROM DHCP SERVER IS MANAGED WITHIN TIME t IN OPEN ADDRESS DATABASE

FIG. 10D

| ACTIVE USER IDENTIFIER(MN-NAI) | ACTIVE ADDRESS | ACTIVE USER PRIORITY |
|---|---|---|
| | | |

| USER IDENTIFIER (MN-NAI) | USER PRIORITY |
|---|---|
| aaa1 | PRIORITY A |
| aaa2 | PRIORITY A |
| aaa3 | PRIORITY A |
| aaa4 | PRIORITY A |
| aaa5 | PRIORITY A |
| bbb1 | PRIORITY B |
| bbb2 | PRIORITY B |
| bbb3 | PRIORITY B |
| bbb4 | PRIORITY B |
| bbb5 | PRIORITY B |
| bbb6 | PRIORITY B |
| bbb7 | PRIORITY B |
| bbb8 | PRIORITY B |
| bbb9 | PRIORITY B |
| bbb10 | PRIORITY B |

FIG. 11B

| ADDRESS | ACTIVE USER IDENTIFIER (MN-NAI) | ACTIVE USER PRIORITY |
|---|---|---|
| aaa.aaa.aaa.aa1 | aaa3 | PRIORITY A |
| aaa.aaa.aaa.aa2 | bbb10 | PRIORITY B |
| aaa.aaa.aaa.aa3 | | |

| ADDRESS | OPEN TIME | FORCED DELETE RANK |
|---|---|---|
| | | |

| ACTIVE USER IDENTIFIER (MN-NAI) | ACTIVE ADDRESS | ACTIVE USER PRIORITY | LT |
|---|---|---|---|
| aaa3 | aaa.aaa.aaa.aa1 | PRIORITY A | |
| bbb1 | bbb.bbb.bbb.bb1 | PRIORITY B | |
| bbb2 | bbb.bbb.bbb.bb2 | PRIORITY B | |
| bbb3 | bbb.bbb.bbb.bb3 | PRIORITY B | |
| bbb4 | bbb.bbb.bbb.bb4 | PRIORITY B | |
| bbb5 | bbb.bbb.bbb.bb5 | PRIORITY B | |
| bbb10 | aaa.aaa.aaa.aa2 | PRIORITY B | |

180

*1: IT IS INDICATED THAT USER bbb10 USES PRIORITY-A USER IP ADDRESS
*2: IT IS INDICATED THAT USER bbb10 USES PRIORITY-A USER IP ADDRESS

FIG. 12A

| USER IDENTIFIER(MN-NAI) | USER PRIORITY |
|---|---|
| aaa1 | PRIORITY A |
| aaa2 | PRIORITY A |
| aaa3 | PRIORITY A |
| aaa4 | PRIORITY A |
| aaa5 | PRIORITY A |
| bbb1 | PRIORITY B |
| bbb2 | PRIORITY B |
| bbb3 | PRIORITY B |
| bbb4 | PRIORITY B |
| bbb5 | PRIORITY B |
| bbb6 | PRIORITY B |
| bbb7 | PRIORITY B |
| bbb8 | PRIORITY B |
| bbb9 | PRIORITY B |
| bbb10 | PRIORITY B |

| ADDRESS | ACTIVE USER IDENTIFIER(MN-NAI) | ACTIVE USER PRIORITY |
|---|---|---|
| aaa.aaa.aaa.aa1 | aaa1 | PRIORITY A |
| aaa.aaa.aaa.aa2 | aaa2 | PRIORITY A |
| aaa.aaa.aaa.aa3 | aaa3 | PRIORITY A |
| | | |
| | | |
| | | |
| | | |
| | | |
| | | |
| | | |
| | | |
| | | |
| | | |
| | | |

FIG. 12C

| ADDRESS | OPEN TIME | FORCED DELETE RANK |
|---------|-----------|--------------------|
|  |  |  |
|  |  |  |
|  |  |  |
|  |  |  |
|  |  |  |
|  |  |  |
|  |  |  |
|  |  |  |
|  |  |  |
|  |  |  |
|  |  |  |
|  |  |  |

| ACTIVE USER IDENTIFIER (MN-NAI) | ACTIVE ADDRESS | ACTIVE USER PRIORITY | LT |
|---|---|---|---|
| aaa1 | aaa.aaa.aaa.aa1 | PRIORITY A |  |
| aaa2 | aaa.aaa.aaa.aa2 | PRIORITY A |  |
| aaa3 | aaa.aaa.aaa.aa3 | PRIORITY A |  |
| bbb1 | bbb.bbb.bbb.bb1 | PRIORITY B |  |
| bbb2 | bbb.bbb.bbb.bb2 | PRIORITY B |  |
| bbb3 | bbb.bbb.bbb.bb3 | PRIORITY B |  |
| bbb4 | bbb.bbb.bbb.bb4 | PRIORITY B |  |
| bbb5 | bbb.bbb.bbb.bb5 | PRIORITY B |  |
| bbb6 | bbb.bbb.bbb.bb6 | PRIORITY B |  |
| bbb7 | bbb.bbb.bbb.bb7 | PRIORITY B |  |
| ccc1 | ccc.ccc.ccc.cc1 | PRIORITY C |  |
| ccc2 | ccc.ccc.ccc.cc2 | PRIORITY C |  |
| ccc3 | ccc.ccc.ccc.cc3 | PRIORITY C |  |
| ccc4 | ccc.ccc.ccc.cc4 | PRIORITY C |  |

FIG. 13A

| USER IDENTIFIER(MN-NAI) | USER PRIORITY |
|---|---|
| aaa1 | PRIORITY A |
| aaa2 | PRIORITY A |
| aaa3 | PRIORITY A |
| aaa4 | PRIORITY A |
| aaa5 | PRIORITY A |
| bbb1 | PRIORITY B |
| bbb2 | PRIORITY B |
| bbb3 | PRIORITY B |
| bbb4 | PRIORITY B |
| bbb5 | PRIORITY B |
| bbb6 | PRIORITY B |
| bbb7 | PRIORITY B |
| bbb8 | PRIORITY B |
| bbb9 | PRIORITY B |
| bbb10 | PRIORITY B |

| ADDRESS | ACTIVE USER IDENTIFIER(MN-NAI) | ACTIVE USER PRIORITY |
|---|---|---|
| aaa.aaa.aaa.aa1 | aaa1 | PRIORITY A |
| aaa.aaa.aaa.aa2 | aaa2 | PRIORITY A |
| aaa.aaa.aaa.aa3 | aaa3 | PRIORITY A |
|  |  |  |
|  |  |  |
|  |  |  |
|  |  |  |
|  |  |  |
|  |  |  |
|  |  |  |
|  |  |  |
|  |  |  |
|  |  |  |
|  |  |  |

FIG. 13C

| ADDRESS | OPEN TIME | FORCED DELETE RANK | |
|---|---|---|---|
| CCC.CCC.CCC.CC2 | Z | PRIORITY A | ⎫ |
| CCC.CCC.CCC.CC3 | Z | PRIORITY A | ⎬ 170 |
| CCC.CCC.CCC.CC4 | Z | PRIORITY A | ⎭ |
|  |  |  |  |
|  |  |  |  |
|  |  |  |  |
|  |  |  |  |
|  |  |  |  |
|  |  |  |  |

*1: IP ADDRESS USED BY PRIORITY-C USER IS STROED IN OPEN ADDRESS DATABASE
*2: ALLOCATION TO USERS OTHER THAN PRIORITY-A USERS IS INHIBITED WITHIN TIME z

| ACTIVE USER IDENTIFIER (MN-NAI) | ACTIVE ADDRESS | ACTIVE USER PRIORITY | LT |
|---|---|---|---|
| aaa1 | aaa.aaa.aaa.aa1 | PRIORITY A | |
| aaa2 | aaa.aaa.aaa.aa2 | PRIORITY A | |
| aaa3 | aaa.aaa.aaa.aa3 | PRIORITY A | |
| bbb1 | bbb.bbb.bbb.bb1 | PRIORITY B | |
| bbb2 | bbb.bbb.bbb.bb2 | PRIORITY B | |
| bbb3 | bbb.bbb.bbb.bb3 | PRIORITY B | |
| bbb4 | bbb.bbb.bbb.bb4 | PRIORITY B | |
| bbb5 | bbb.bbb.bbb.bb5 | PRIORITY B | |
| bbb6 | bbb.bbb.bbb.bb6 | PRIORITY B | |
| bbb7 | bbb.bbb.bbb.bb7 | PRIORITY B | |
| aaa4 | ccc.ccc.ccc.cc1 | PRIORITY A | |

*1: PRIORITY-C USER IS FORCIBLY DELETED
*2: ONE OF IP ADDRESSES USED BY PRIORITY-C USERS IS ALLOCATED TO PRIORITY-A USER

FIG. 14A

| USER IDENTIFIER(MN-NAI) | USER PRIORITY |
|---|---|
| aaa1 | PRIORITY A |
| aaa2 | PRIORITY A |
| aaa3 | PRIORITY A |
| aaa4 | PRIORITY A |
| aaa5 | PRIORITY A |
| bbb1 | PRIORITY B |
| bbb2 | PRIORITY B |
| bbb3 | PRIORITY B |
| bbb4 | PRIORITY B |
| bbb5 | PRIORITY B |
| bbb6 | PRIORITY B |
| bbb7 | PRIORITY B |
| bbb8 | PRIORITY B |
| bbb9 | PRIORITY B |
| bbb10 | PRIORITY B |
| | |

| ADDRESS | ACTIVE USER IDENTIFIER(MN-NAI) | ACTIVE USER PRIORITY |
|---|---|---|
| aaa.aaa.aaa.aa1 | aaa1 | PRIORITY A |
| aaa.aaa.aaa.aa2 | aaa2 | PRIORITY A |
| aaa.aaa.aaa.aa3 | aaa3 | PRIORITY A |
| | | |
| | | |
| | | |
| | | |
| | | |
| | | |
| | | |
| | | |
| | | |
| | | |
| | | |
| | | |

FIG. 14C

| ADDRESS | OPEN TIME | FORCED DELETE RANK |
|---|---|---|
| ccc.ccc.ccc.cc2 | t | |
| ccc.ccc.ccc.cc3 | t | |
| ccc.ccc.ccc.cc4 | t | |
| | | |
| | | |
| | | |
| | | |
| | | |
| | | |
| | | |
| | | |
| | | |

170

*1: PREFERENTIAL ALLOCATION MODE TO PRIORITY-A USER IS SWITCHED OVER TO GENERAL ALLOCATION MODE BY CLEARING FORCED DELETE RANK AFTER ELAPSE OF PROTECTION TIME z OF FORCIBLY DELETED IP ADDRESS AND REWRITING STORAGE CONTENT WITHIN OPEN TIME t, AND OBTAINED IP ADDRESS IS RETURNED TO DHCP SERVER AFTER ELAPSE OF OPEN TIME t. IF REGISTRATION REQUESTS ARE GIVEN FROM PRIORITY-A, -B AND -C USERS, IP ADDRESSES STORED IN OPEN ADDRESS DATABASE ARE ALLOCATED

| ACTIVE USER IDENTIFIER (MN-NAI) | ACTIVE ADDRESS | ACTIVE USER PRIORITY | LT |
|---|---|---|---|
| aaa1 | aaa.aaa.aaa.aa1 | PRIORITY A | |
| aaa2 | aaa.aaa.aaa.aa2 | PRIORITY A | |
| aaa3 | aaa.aaa.aaa.aa3 | PRIORITY A | |
| bbb1 | bbb.bbb.bbb.bb1 | PRIORITY B | |
| bbb2 | bbb.bbb.bbb.bb2 | PRIORITY B | |
| bbb3 | bbb.bbb.bbb.bb3 | PRIORITY B | |
| bbb4 | bbb.bbb.bbb.bb4 | PRIORITY B | |
| bbb5 | bbb.bbb.bbb.bb5 | PRIORITY B | |
| bbb6 | bbb.bbb.bbb.bb6 | PRIORITY B | |
| bbb7 | bbb.bbb.bbb.bb7 | PRIORITY B | |
| aaa4 | ccc.ccc.ccc.cc1 | PRIORITY A | |
| | | | |

FIG. 15

250 ADDRESS INFORMATION DATABASE

| LEASE IP ADDRESS | CLIENT IDENTIFIER | LEASE TIME | |
|---|---|---|---|
| nnn.nnn.nnn.nn1 | abc1 | l | ← ON-LEASE OF nnn.nnn.nnn.nn1 TO CLIENT abc1 |
| nnn.nnn.nnn.nn2 | abc2 | m | ← ON-LEASE OF nnn.nnn.nnn.nn2 TO CLIENT abc2 |
| nnn.nnn.nnn.nn3 | abc3 | n | ← ON-LEASE OF nnn.nnn.nnn.nn3 TO CLIENT abc3 |
| nnn.nnn.nnn.nn4 | | | ← UNUSED (FREE) |
| ... | | | |
| nnn.nnn.nnn.mmm | | | ← UNUSED (FREE) |

MOBILE IP NETWORK SYSTEM

BACKGROUND OF THE INVENTION

The present invention relates to a mobile IP network system having an address allocation management function of dynamically allocating an address to a mobile node in accordance with the mobile Internet Protocol (mobile IP).

There have increased over the recent years communication modes of utilizing handheld information terminals such as PDAs (Personal Digital Assistants), notebook type personal computers and so on as communication terminals and connecting these terminals to the IP network from a variety of places different from those usual.

The present Internet Protocol technology and mobile IP (strictly, mobile IPv4) technology enable mobility transparent communications to be actualized in a mobile IP network system, wherein a node connected normally to specified network (that may be called a home network as a base network to a mobile target node (mobile communication terminal)) is temporarily connected as a mobile node to a different network (a foreign network utilized in a local area to which the mobile node moves), and receives an IP packet originally addressed (transmitted) to a fixed IP address (home address) of this mobile node from a sender node in the home network, and namely the IP packets are forwarded to anywhere the mobile node moves to.

A method of allocating the IP address fixedly to the mobile node concerned and a method of temporarily allocating (leasing) IP address on the basis of DHCP (Dynamic Host Configuration Protocol) are provided as methods of allocating the IP address as a home address to the mobile node.

According to this DHCP, a DHCP server batchwise manages the IP addresses. For example, if the mobile node as an information device is newly connected to the home network and operated, this information device functions as a DHCP client (client terminal).

The DHCP client normally connected to the home network broadcasts an IP address allocation requests to the DHCP server on the home network immediately after the DHCP client has been operated. The DHCP server detecting this IP address allocation request provides the DHCP client with an IP address that can be allocated at that point of time.

In the case of the mobile node, this mobile node, when accessing the home network via the foreign network, sends a registration request to the home agent. If the IP address (home address) of the mobile node is not yet set at this registration request time, it is a rule that the home agent as a proxy of the mobile node obtains the IP address from the DHCP server and notifies the mobile node connected to the foreign network of this obtained IP address. It does not happen that the mobile node requests directly the DHCP server to allocate the IP address.

An up-to-date and popular way of utilizing the mobile node is that the user of the mobile node establishes a contract with a provider such as ISP (Internet Service Provider) for providing a certain category of information communication service and receives this service.

The number of the mobile nodes (contract user count) receiving this service is larger than the number of the IP address held by the provider, and it is therefore impossible for all the mobile nodes to receive the services at the same timing. Consequently, there appear the users who desire to use the mobile nodes any time in a way that corresponds to a content of the contract.

Further, if a registration request is given from the mobile node, the DHCP server must allocate the IP address to the mobile node. When used as by an e-mail and if accessed from a multiplicity of mobile nodes all day though short in time, the DHCP server allocates the IP address each time, a rise in load upon the home network is inevitable.

According to the conventional mobile IP network system, if the mobile node is unable to obtain the IP address from the DHCP server, or if unable to obtain the IP address from a reserve pool held by the home agent, the mobile node cannot be provided with the mobility transparent communication service.

FIGS. 21(A) and 21(B) show an outline of a process for dynamically allocating the IP address to the mobile node in the conventional mobile IP network system.

The conventional mobile IP network system, though an illustration of this system architecture is herein omitted, includes a home network system and a foreign network system. The home network system is connected to the foreign network system via an IP (IPv4) network such as the Internet or Intranet.

The home network system is configured by a home network, a home agent connected to this home network and serving to administer a connection from the foreign network, and a general terminal (a mobile node as a mobile target).

Further, the foreign network system is configured by a foreign network, a mobile node connected to the foreign network, making a request for an access to the home network and forwarding/receiving IP packets, and a foreign agent that administers a connection to the home network from the mobile node via the foreign network.

The home agent in the home network system has an address allocation management function of dynamically allocating the IP address (home address) to a device connected afresh via the foreign network.

As indicated by processing steps SA01 to SA05 shown in FIG. 21(A) and processing steps SB01 to SB05 shown in FIG. 21(B), when the home agent receives a new registration request from the mobile node connected to the foreign network via the foreign agent, the home agent, based on the address allocation management function, obtains an IP address to be temporarily allocated to the mobile node out of the DHCP server or a reserve pool, and continues the registration process for the mobile node with the IP address obtained.

The home agent, if unable to obtain the IP address to be temporarily allocated to the mobile node out of the DHCP server or the reserve pool, sends to the mobile node a reply that the address cannot be obtained. Herein, the DHCP server is normally connected to the home network, and the reserve pool is configured on a memory of the home agent.

Note that if the home agent dynamically allocates the IP address to the mobile node, a method of obtaining a free address from the DHCP server or the reserve pool maybe used in combination.

An address allocation to a specified user (who desires for an ever-use of the mobile node) corresponding to the mobile node can be attained by fixing the IP address to the specified user or reserving beforehand the IP address presumed to be necessary in consideration of a node activity ratio by the specified user and allocating the reserved IP address to the specified user.

The number of the addresses usable for the mobile nodes is, however, a finite number, and it follows that the addresses left after allocating the IP addresses to the specified users are allocated to general users corresponding to the mobile nodes. Hence, the number of the general users allowed to receive the services is limited.

Further, queries of the DHCP server for obtaining the IP addresses lead to a traffic load on the home network.

SUMMARY OF THE INVENTION

It is a primary object of the present invention to provide an address allocation management method capable of relieving, though impossible of avoiding that there might appear some users unable to receive services because of a finite number of IP addresses for mobile nodes, en exhaustion of the IP addresses by using the IP addresses as effectively as possible, and of reducing a traffic on a home network.

To accomplish the above object, according to one aspect of the present invention, a first home agent that provides mobility transparent communications to a mobile node temporarily connected to a second network as a mobile destination different from a first network normally utilized, comprises a module receiving a new registration request from the mobile node via the second network, a module detecting, when receiving the new registration request, that lease addresses of a DHCP server and addresses pooled beforehand are all occupied, and a module searching for, when detecting that all the addresses are occupied, an address on the basis of self-managed information and allocating the searched address to the mobile node.

A second home agent according to the present invention may further comprise a module temporarily pooling the address requested to be open by the mobile node without immediately returning the address to the DHCP server.

A third home agent according to the present invention may further comprise a module allocating the temporarily pooled address to the mobile node making the new registration request.

A fourth home agent according to the present invention may further comprise a module extracting an address just before time-out of a life time and allocating this extracted address to the mobile node making the new registration request. Herein, the address just before the time-out of the life time may be extracted from a mobile binding list.

A fifth home agent according to the present invention may further comprise a module administering address allocation priorities of users corresponding to the mobile nodes.

A sixth home agent according to the present invention may further comprise a module, when the new registration request is given from the mobile node used by a higher priority user, extracting a lower priority user, stopping providing a mobile service to the extracted user, and allocating an address used by the extracted user to the mobile node making the new registration request.

A seventh home agent according to the present invention may further comprise a module extracting, when the new registration request is given from the mobile node used by a higher priority user, all lower priority users, and stopping providing mobile services to all the lower priority users extracted.

An eighth home agent according to the present invention may further comprise a module temporarily pooling the address used by the user stopped from receiving the mobile service without immediately returning the same address to the DHCP server.

According to the present invention, the address requested to be open by the mobile node is not immediately returned to the DHCP server but is temporarily pooled in the home agent, thereby making it possible to decrease both of the access count to the DHCP server and the home network traffic.

Further, according to the present invention, the address temporarily pooled is allocated to the mobile node making the new registration request, thereby making it possible to decrease both of the access count to the DHCP server and the hone network traffic.

Moreover, according to the present invention, the address just before the time-out of the life time is extracted from the mobile binding list, whereby the address extracted can be allocated to the mobile node as the new registration requester without waiting for the time-out.

Furthermore, according to the present invention, the address allocation priorities of the registered users are administered, whereby the services differentiated based on the priorities can be provided.

According to the present invention, when the registration request is given from the mobile node used by the higher priority user, the lower priority user is extracted from the mobile binding list and stopped from receiving the mobile service, thereby making it feasible to enhance the service provided to the higher priority user.

According to the present invention, the address used by the user stopped from receiving the mobile service is not immediately returned to the DHCP server but is temporarily pooled in the home agent, thereby making it possible to decrease both of the access count to the DHCP server and the home network traffic.

Still further, a scheme according to the present invention is that the address is, as if seemingly usable any time without allocating the address to the single specified user, allocated to the general user when the specified user does not use the mobile node, the number of the addresses usable at the same timing can be increased.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein:

FIG. 3 is an explanatory diagram showing a user information database, a priority address database, an open address database and a mobile binding list, that constitute a home agent;

FIG. 4 is an explanatory diagram showing the user information database, the priority address database, the open address database and the mobile binding list, that constitute the home agent;

FIG. 5 is an explanatory diagram showing the user information database, the priority address database, the open address database and the mobile binding list, that constitute the home agent;

FIG. 6 is an explanatory diagram showing the user information database, the priority address database, the open address database and the mobile binding list, that constitute the home agent;

FIG. 7 is an explanatory diagram showing the user information database, the priority address database, the open address database and the mobile binding list, that constitute the home agent;

FIG. 8 is an explanatory diagram showing the user information database, the priority address database, the open address database and the mobile binding list, that constitute the home agent;

FIG. 9 is an explanatory diagram showing the user information database, the priority address database, the open address database and the mobile binding list, that constitute the home agent;

FIG. 10 is an explanatory diagram showing the user information database, the priority address database, the open address database and the mobile binding list, that constitute the home agent;

FIG. 11 is an explanatory diagram showing the user information database, the priority address database, the open address database and the mobile binding list, that constitute the home agent;

FIG. 12 is an explanatory diagram showing the user information database, the priority address database, the open address database and the mobile binding list, that constitute the home agent;

FIG. 13 is an explanatory diagram showing the user information database, the priority address database, the open address database and the mobile binding list, that constitute the home agent;

FIG. 14 is an explanatory diagram showing the user information database, the priority address database, the open address database and the mobile binding list, that constitute the home agent;

FIG. 15 is an explanatory diagram showing an address information database constituting a DHCP server;

DETAILED DESCRIPTION OF THE PREFERRED EMBODIMENTS

Embodiments of the present invention will hereinafter be described with reference to the accompanying drawings.

[Architecture of Mobile IP Network System]

Figure 1:
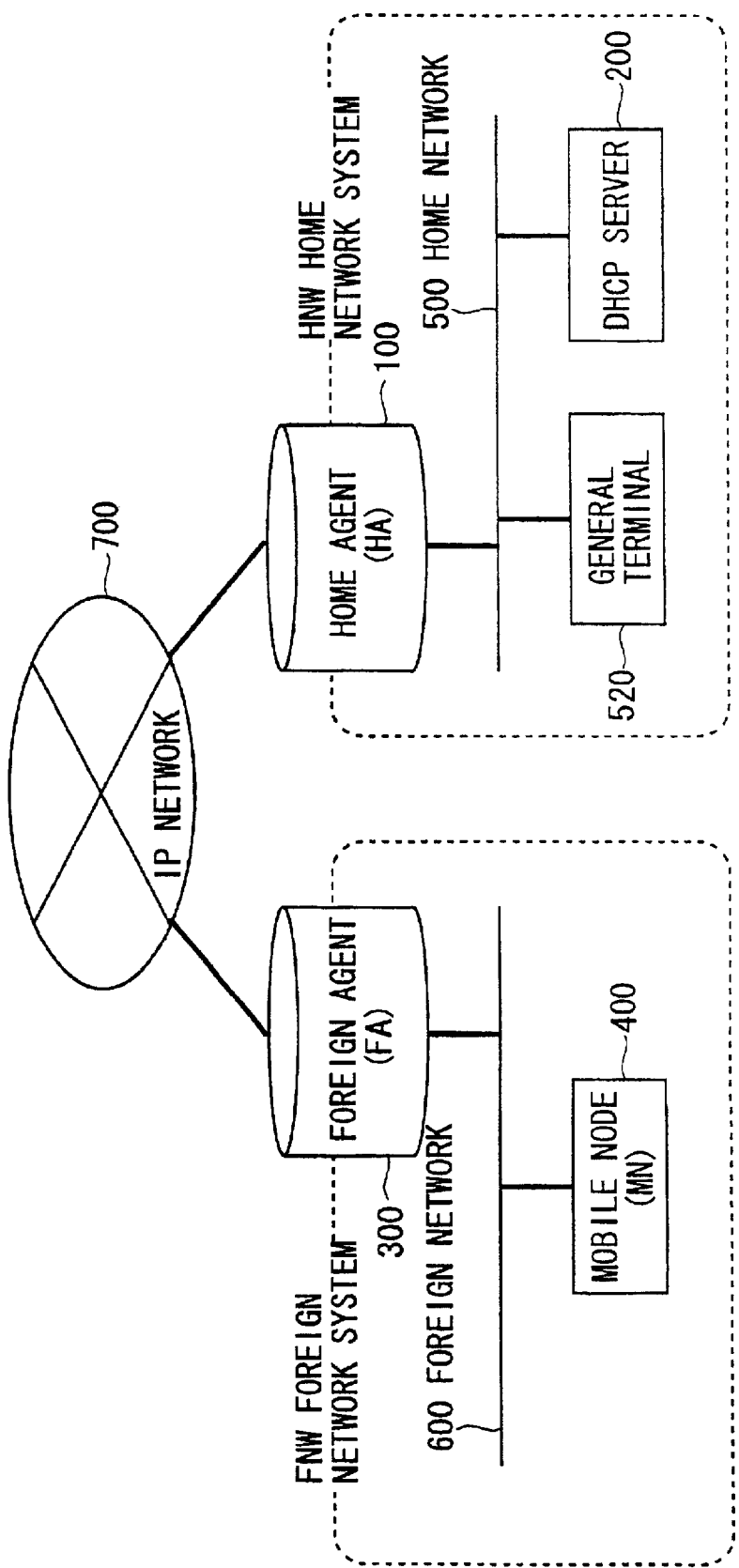
FIG. 1 is a block diagram showing an outline of an architecture of a mobile IP network system in one embodiment of the present invention.
Figure 2:
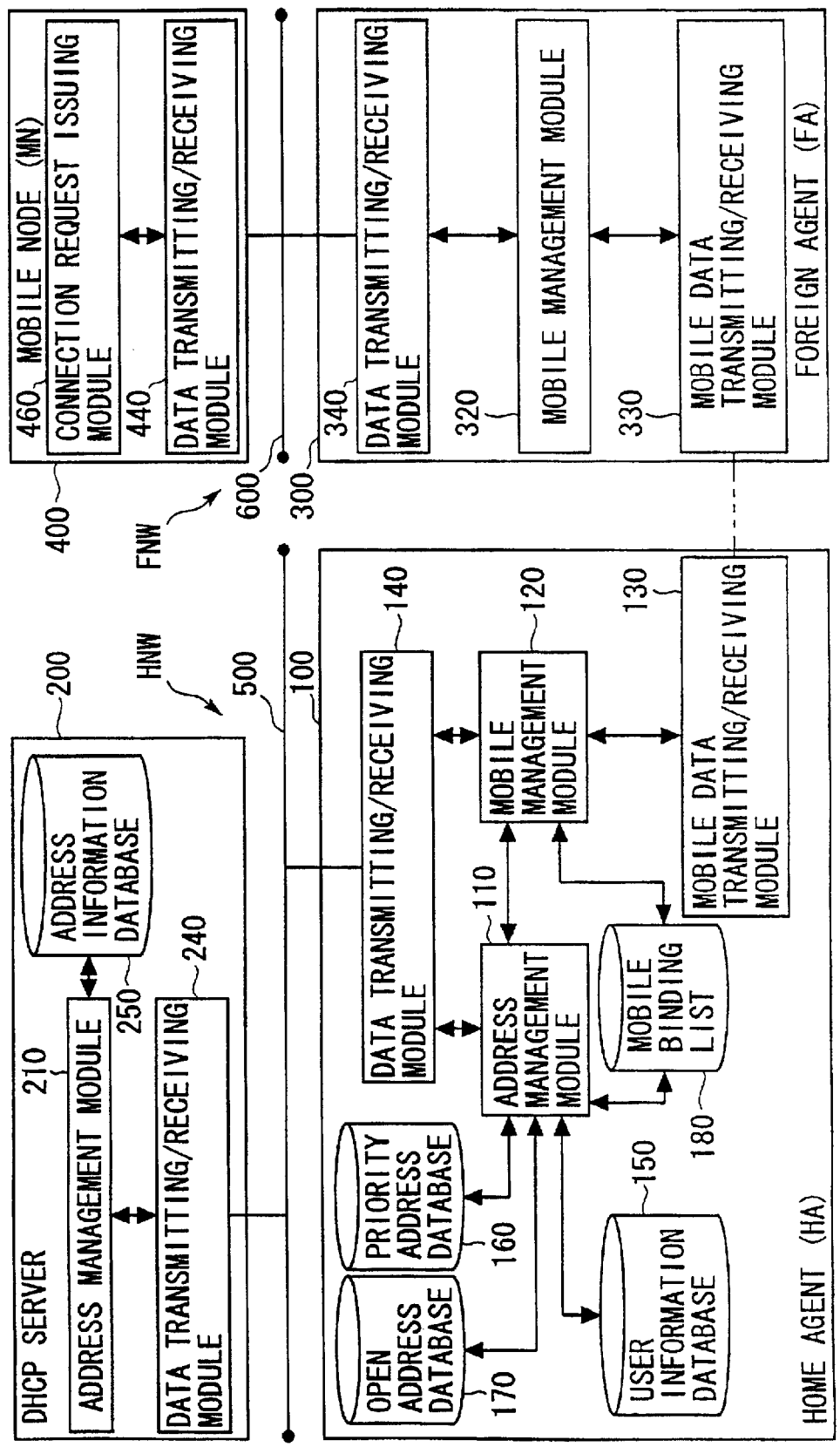
FIG. 2 is a block diagram showing the detailed architecture of the mobile IP network system shown in FIG. 1.

FIGS. 1 and 2 show an architecture of a mobile IP network system in one embodiment of the present invention. Referring to FIGS. 1 and 2, this mobile IP network system SYS includes a home network system HNM and a foreign network system FNW. The home network system HNM is connected to the foreign network system FNW via an IP (IPv4) network 700 such as the Internet or Intranet.

The home network system HNW is configured by a home network 500 such as a wireless LAN, a home agent (HA) 100 connected to the home network 500 and serving to administer a connection from the foreign network, a DHCP server 200 as a lender of an IP address (that might be simply called an address), i.e., a home address, and a general terminal (a mobile node as a mobile target) 520.

Further, the foreign network system FNW is configured by a foreign network 600 such as the wireless LAN, a mobile node (MN) 400 connected to the foreign network 600, making a request for an access to the home network 500 and forwarding/receiving IP packets, and a foreign agent (FA) 300 that administers a connection to the home network 500 from the mobile node 400 via the foreign network 600.

The home agent 100 in the home network system HNW has an address allocation management function of dynamically allocating the IP address as a home address to the mobile node 400 connected afresh via the foreign network 600.

To give a more detailed description, the home agent 100 and the foreign agent 300 are categorized as routers. In the home agent 100, an address management module 110 has a function of managing a user information database 150, a priority address database 160 and an open address database 170, and a function of referring to a mobile binding list 180. The address management module 110 administers address-related control processes (allocation/open).

A mobile management module 120 administers mobile-related processes and, if the address-related control process occurs, entrusts the address management module 110 with this process. The home agent 100 further includes a mobile data transmitting/receiving module 130 connected via an IP network 700 to the foreign agent 300, and a data transmitting/receiving module 140 connected to the DHCP server 200 via the home network The DHCP server 200 includes an address management module 210, a data transmitting/receiving module 240, and an address information database 250. The address management module 210, based on the DHCP defined as a server/client type protocol, dynamically allocates (leases) the IP address to each mobile node 400 when booted and collects the lease IP addresses when ended.

The foreign agent 300 includes a mobile management module 320, a mobile data transmitting/receiving module 330, and a data transmitting/receiving module 340. The mobile management module 320 administers mobile-related processes between the home agent 100 and the mobile node 400.

The mobile node 400 includes a data transmitting/receiving module 440 and a connection request issuing module 460. The connection request issuing module 460 issues a registration request message or an open request message as a connection request.

Note that each of the general terminals 520 and the mobile nodes 400 as the mobile terminals (mobile communication terminals) may be, if structured to implement a communication function, and information display function and an information specifying function, a single or composite unit of any one category of mobile phone terminals of i-mode, EZweb, J-sky and so on, and mobile information terminals such as PDAs (Personal Digital Assistants), notebook type personal computers and so forth.

[Various Categories of Databases]

Next, various categories of databases possessed by each of the home agent 100 and the DHCP server 200 in the home network system HNW described above, will be explained.

FIGS. 3(A), 3(B), 3(C) and 3(D) through FIGS. 14(A), 14(B), 14(C) and 14(D) show one examples of data stored in the user information database 150, the priority address database 160, the open address database 170 and the mobile binding list 180 that constitute the home agent 100.

FIG. 15 shows one example of data stored in the address information database 250 constituting the DHCP server 200.

Herein, a user priority of using the mobile node is categorized into three levels for simplifying the description, however, much more levels may also be set. Further, a priority rank is set such as a priority A>a priority B>a priority C in this example.

Namely, the implication is that the user given the priority A is a specified user having the top priority, the user given the priority B is a general user having a middle priority, and the user given the priority C is a user (allowed to access, e.g., free of charge as a trial) having the lowest priority. Moreover, it is assumed that an active user count (the number of users using the mobile nodes) be based on a relationship such as the priority A<the priority B>the priority C.

In the discussion made herein, categories of the data stored in the respective databases and transitions of the data stored in the databases that correspond to variations in mobile node oriented users' activities, will be explained.

(1) FIGS. 3(A), 3(B), 3(C) and 3(D) show states of the databases when none of users are active, i.e. when none of the mobile nodes 400 are connected to the foreign network 600 in the foreign network system FNW.

As illustrated in FIG. 3(A), when none of the users are active, the user information database 150 is registered beforehand with mappings of mobile node (connection) oriented user identifiers (MN-NAI: Mobile Node-Network Access Identifiers) to users' priorities.

In this example, totally 15 users, i.e., five users (user identifiers: aaa1 to aaa5) given the priority A and ten users (user identifiers: bbb1 to bbb10) given the priority B, are registered beforehand in the user information database 150.

Further, as illustrated in FIG. 3 (B), n-pieces of addresses (home agent HA acquisition addresses) allowing for a priority-A user count and an activity ratio, are obtained from the DHCP server 200, and registered beforehand in the priority address database 160.

In this example, five users with the priority A are registered in the user information database 150, and hence IP addresses aaa.aaa.aaa.aa1 through aaa.aaa.aaa.aa3 for three users given the priority A are acquired and previously registered in consideration of the activity ratios.

As shown in FIG. 3(C), an IP address, an open time and a forced delete rank are stored in the open address database 170.

The address registered in the open address database 170 is an address (a lease IP address) leased by the home agent 100 from the DHCP server 200.

The [forced delete rank[ in the open address database 170 is defined as a sub-item to the address forcibly acquired from the priority-B user (general user) or the priority-C user (the lowest priority user). The data entered in this [forced delete rank] field indicate which user, the priority-A user or priority-B user or others, the forcibly acquired address is allocated to.

Further, the [open time] in the open address database 170 represents a time (effective time t) for pooling for a certain period of time, and a time (protection time z) that permits the forcibly acquired address to be allocated to the higher priority user.

Namely, when the open time expires, the address is returned to the DHCP server 200. If the open time is within a time (a protection time: z1) for which the address can not be allocated to the priority-B user, the address allocation to the priority-B user is rejected, and if within a time (a protection time: z2) for which the address can not be allocated to the priority-C user, the address allocation to the priority-C user is rejected. Herein, a relationship between the protection times z1 and z2 is that the priority B (z1) is to be longer than the priority C (z2).

Further, as shown in FIG. 3(D), the mobile binding list 180 is stored with an active user identifier, an active address, an active user priority and a life time LT.

(2) FIGS. 4(A), 4(B), 4(C) and 4(D) show statuses in the databases when only the user aaa1 is active, i.e., when the mobile node 400 used by the user aaa1 is connected to the foreign network 600 in the foreign network system FNW.

As shown in FIG. 4(B), the user aaa1 is given the priority A and is therefore is allowed to use the IP address aaa.aaa.aaa.aa1 registered beforehand in the priority address database 160, and this status can be administered based on contents stored in the priority address database 160.

Further, as shown in FIG. 4(D), it is possible to administer the status that the user aaa1 uses the IP address aaa.aaa.aaa.aa1 on the basis of the contents stored in the mobile binding list 180.

(3) FIGS. 5(A), 5(B), 5(C) and 5(D) show statuses in the databases when the users aaa1 and bbb1 are active, i.e., when the mobile bodes 400 used by the users aaa1 and bbb1 are connected to the foreign network 600 in the foreign network system FNW.

As shown in FIG. 5(B), the user aaa1 is given the priority A and is therefore is allowed to use the IP address aaa.aaa.aaa.aa1 registered beforehand in the priority address database 160, and this status can be administered based on contents stored in the priority address database 160.

The user bbb1 is, however, given the priority B and therefore needs to obtain an IP address bbb.bbb.bbb.bb1 from the DHCP server 200. If the user bbb1 obtains the IP address bbb.bbb.bbb.bb1 from the DHCP server 200, as shown in FIG. 15, [bbb.bbb.bbb.bb1] as a lease IP address and [abc1 (an identifier of the home agent 100)] as a client identifier are stored together with a lease time [1] in the address information database 250 of the DHCP server 200.

As shown in FIG. 5(D), it is possible to administer the status that the users aaa1 and bbb1 use the IP addresses aaa.aaa.aaa.aa1 and bbb.bbb.bbb.bb1 on the basis of the contents stored in the mobile binding list 180. Moreover, a residual time x1 of the life time LT of the lease IP address allocated to the user bbb1 can be administered.

(4) FIGS. 6(A), 6(B), 6(C) and 6(D) show statuses in the databases when the user bbb1 finishes using the mobile mode.

As shown in FIG. 6(D), when the user bbb1 finishes the use, a record corresponding thereto is deleted from the contents stored in the mobile binding list 180. Further, as shown in FIG. 6(C), the IP address bbb.bbb.bbb.bb1 used so far by the user bbb1 is stored within the open time (effective time) t in the open address database 170 and administered therein. This open time t is shorter than the lease time [1].

(5) FIGS. 7(A), 7(B), 7(C) and 7(D) show statuses in the databases when the user bbb2 starts using the mobile mode from the status shown in the process (4).

As shown in FIG. 7(D), when the user bbb2 starts the use, a record corresponding thereto is added to the mobile binding list 180. Based on the contents stored in the mobile binding list 180, it is feasible to administer the status that the users aaa1, bbb2 use the IP addresses aaa.aaa.aaa.aa1 and bbb.bbb.bbb.bb1, respectively.

Further, as shown in FIG. 7(C), the IP address bbb.bbb.bbb.bb1 used by the user bbb1 is reused by the user bbb2 (the IP address bbb.bbb.bbb.bb1 is obtained not from the DHCP server 200 but from the open address database 170), and hence this is deleted from the contents stored in the open address database 170.

(6) FIGS. 8(A), 8(B), 8(C) and 8(D) show statuses in the databases when a new user does not occur within the open time t from the state in the process (4).

As shown in FIG. (C), if the new user does not occur within the open time t, the IP address bbb.bbb.bbb.bb1 is deleted from the open address database 170.

(7) FIGS. 9(A), 9(B), 9(C) and 9(D) show statuses in the databases when the users aaa1 through aaa5 are active, i.e., when the mobile nodes 400 used by the users aaa1 through aaa5 are respectively connected to the foreign network 600 in the foreign network system FNW.

As shown in FIG. 9(B), it is feasible to administer, based on the contents stored in the priority address database 160, the priority-A users aaa1, aaa5 and aaa4 using the IP addresses aaa.aaa.aaa.aa1 through aaa.aaa.aaa.aa3 registered beforehand in the priority address database 160.

The users aaa2 and aaa3 are given the priority A, however, all the IP addresses registered previously in the priority address database 160 are occupied, and hence there is a necessity of obtaining the IP addresses bbb.bbb.bbb.bb1 and bbb.bbb.bbb.bb2 from the DHCP server 200.

If the users aaa2 and aaa3 acquire the IP addresses bbb.bbb.bbb.bb1 and bbb.bbb.bbb.bb2 from the DHCP server 200 through the home agent 100 as the proxy, the lease IP addresses [bbb.bbb.bbb.bb1 andbbb.bbb.bbb.bb2] and the client identifier [abc1] are stored together with each lease time in the address information database 250 of the DHCP server 200 shown in FIG. 15.

As shown in FIG. 9(D), the status that the users aaa1 through aaa5 respectively use the IP addresses can be administered based on the contents store din the mobile binding list 180.

(8) FIGS. 10(A), 10(B), 10(C) and 10(D) show statuses in the databases when none of the users are active from the status in the process (7).

As shown in FIG. 10(B), the active user identifiers and the priority data of the active users are deleted from the contents stored in the priority address database 160. As shown in FIG. 10(D), all the corresponding records are deleted from the contents stored in the mobile binding list 180.

Further, as shown in FIG. 10(C), the IP addresses bbb.bbb.bbb.bb1 and bbb.bbb.bbb.bb2 obtained from the DHCP server 200 are stored in the open address database 170 and administered up to the open time t.

(9) FIGS. 11(A), 11(B), 11(C) and 11(D) show statuses in the databases when the user given the priority B leases the IP address for the priority-A user.

As shown in FIG. 11(B), it is possible to administer, based on the contents stored in the priority address database 160, a status that the priority-A user aaa3 uses the IP address aaa.aaa.aaa.aa1 registered beforehand in the priority address database 160, and a status that the priority-B user bbb10 uses (leases) the IP address aaa.aaa.aaa.aa2.

As shown in FIG. 11(D), the status that the priority-B user bbb10 uses the IP address aaa.aaa.aaa.aa2 for the priority-A user, can be administered based on the contents stored in the mobile binding list 180.

Note that if the users bbb1 to bbb5 acquire the IP addresses bbb.bbb.bbb.bb1 to bbb.bbb.bbb.bb5 from the DHCP server 200 through the home agent 100 as the proxy, the lease IP addresses [bbb.bbb.bbb.bb1 to bbb.bbb.bbb.bb5] and the client identifier [abc1] are stored together with each lease time in the address information database 250 of the DHCP server 200 shown in FIG. 15.

(10) FIGS. 12(A), 12(B), 12(C) and 12(D) show statuses in the databases when the users given the priorities A, B and C are active one after another.

As shown in FIG. 12(B), a status that the priority-A users aaa1 to aaa3 use the IP addresses aaa.aaa.aaa.aa1 to aaa.aaa.aaa.aa3 registered in beforehand in the priority address database 160, can be administered based on the contents stored in the priority address database 160.

The users bbb1 to bbb7 and ccc1 to ccc4 are given the priorities B and C and therefore need to acquire the IP addresses bbb.bbb.bbb.bb1 to bbb.bbb.bbb.bb7 and ccc.ccc.ccc.cc1 to ccc.ccc.ccc.cc4 from the DHCP server 200.

If the users bbb1 to bbb7 and ccc1 to ccc4 acquire the IP addresses bbb.bbb.bbb.bb1 to bbb.bbb.bbb.bb7 and ccc.ccc.ccc.cc1 to ccc.ccc.ccc.cc4 from the DHCP server 200 through the home agent 100 as the proxy, the lease IP addresses [bbb.bbb.bbb.bb1 to bbb.bbb.bbb.bb7 and ccc.ccc.ccc.cc1 to ccc.ccc.ccc.cc4] and the client identifier [abc1] are stored together with each lease time in the address information database 250 of the DHCP server 200 shown in FIG. 15.

As shown in FIG. 12(D), a status that the users aaa1 to aaa3, bbb1 to bbb7 and ccc1 to ccc4 respectively use the IP addresses, can be administered based on the contents stored in the mobile binding list 180.

(11) FIGS. 13(A), 13(B), 13(C) and 13(D) show statuses in the databases when forcibly deleting all the priority-C users with a service request made by the priority-A user in the status shown in the process (10) and providing the priority A-user with the service.

As shown in FIG. 13(D), all the records corresponding to the priority-C users ccc1 to ccc4 are forcibly deleted from the contents stored in the mobile binding list 180. Then, the IP address ccc.ccc.ccc.cc1 used so far by the priority-C user ccc1 is allocated to the priority-A user aaa4, and this status is administered.

Further, as shown in FIG. 13(C), the IP addresses ccc.ccc.ccc.cc2 to ccc.ccc.ccc.cc4 used so far by the priority-C users ccc2 to ccc4 are stored in the open address database 170. These IP addresses are inhibited from being allocated to the users other than the priority-A users up to the open time (protection time) z in accordance with the contents stored in the [forced delete rank] field.

(12) FIGS. 14(A), 14(B), 14(C) and 14(D) show statuses in the databases after an elapse of the protection time z of the IP address forcibly deleted in the status in the process (11).

FIG. 14(C) shows that a preferential allocation mode to the priority-A user is switched over to a general allocation mode by clearing the forced delete rank after the elapse of the protection time z of the forcibly deleted IP address and rewriting the storage contents at the open time t, and that the IP address obtained is returned to the DHCP server 200 after the open time t has elapsed.

If the priority-A, -B and -C users make registration requests in this status, the IP addresses ccc.ccc.ccc.cc2 through ccc.ccc.ccc.cc4 stored in the open address database 170 can be allocated.

[Address Allocation Management Method]

Next, an address allocation management method in the mobile IP network system SYS in one embodiment of the present invention shown in FIGS. 1 and 2, will be described.

Figure 16:
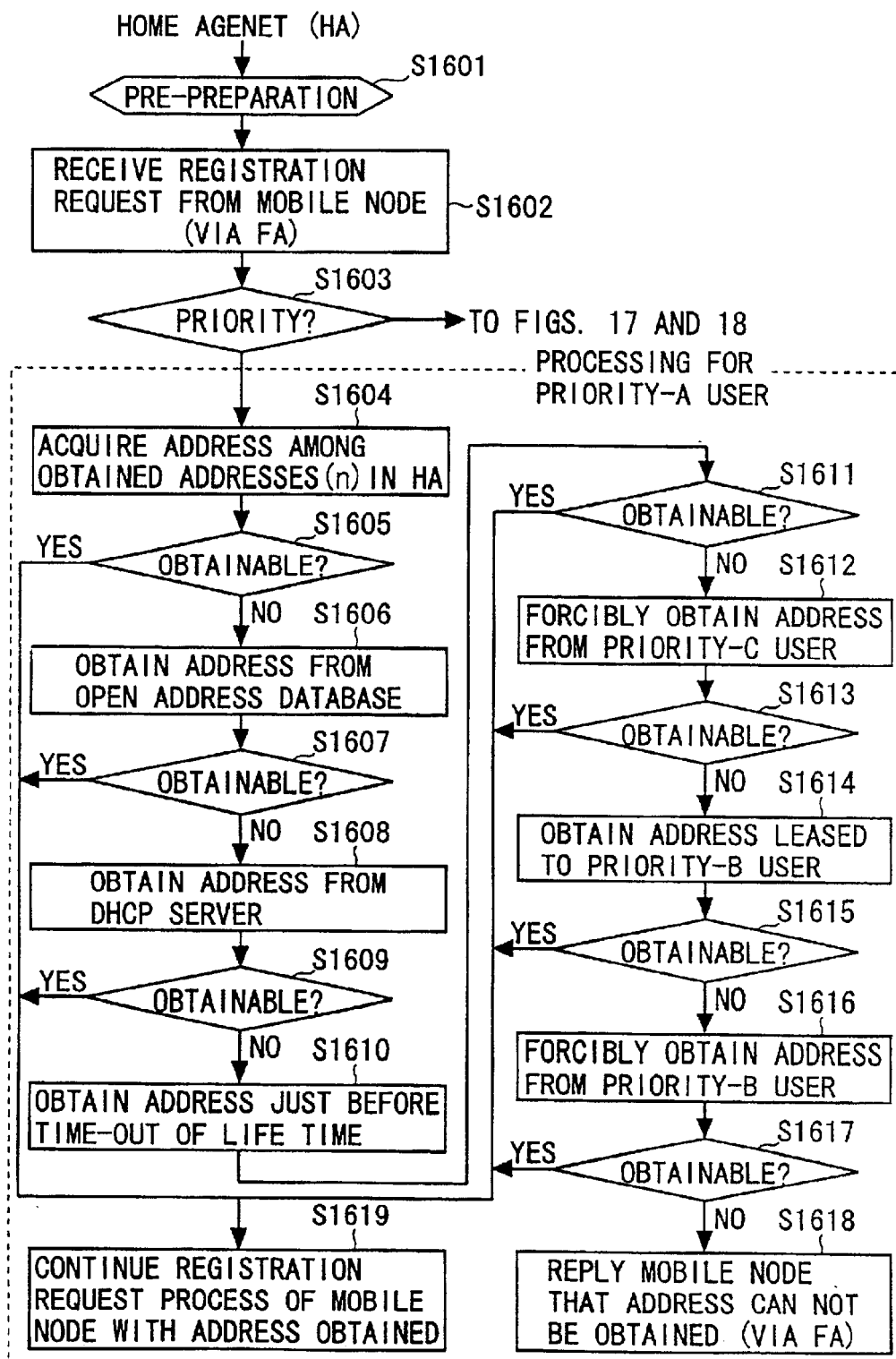
FIG. 16 is a flowchart showing steps of an address allocation management process in the home agent.
Figure 17:
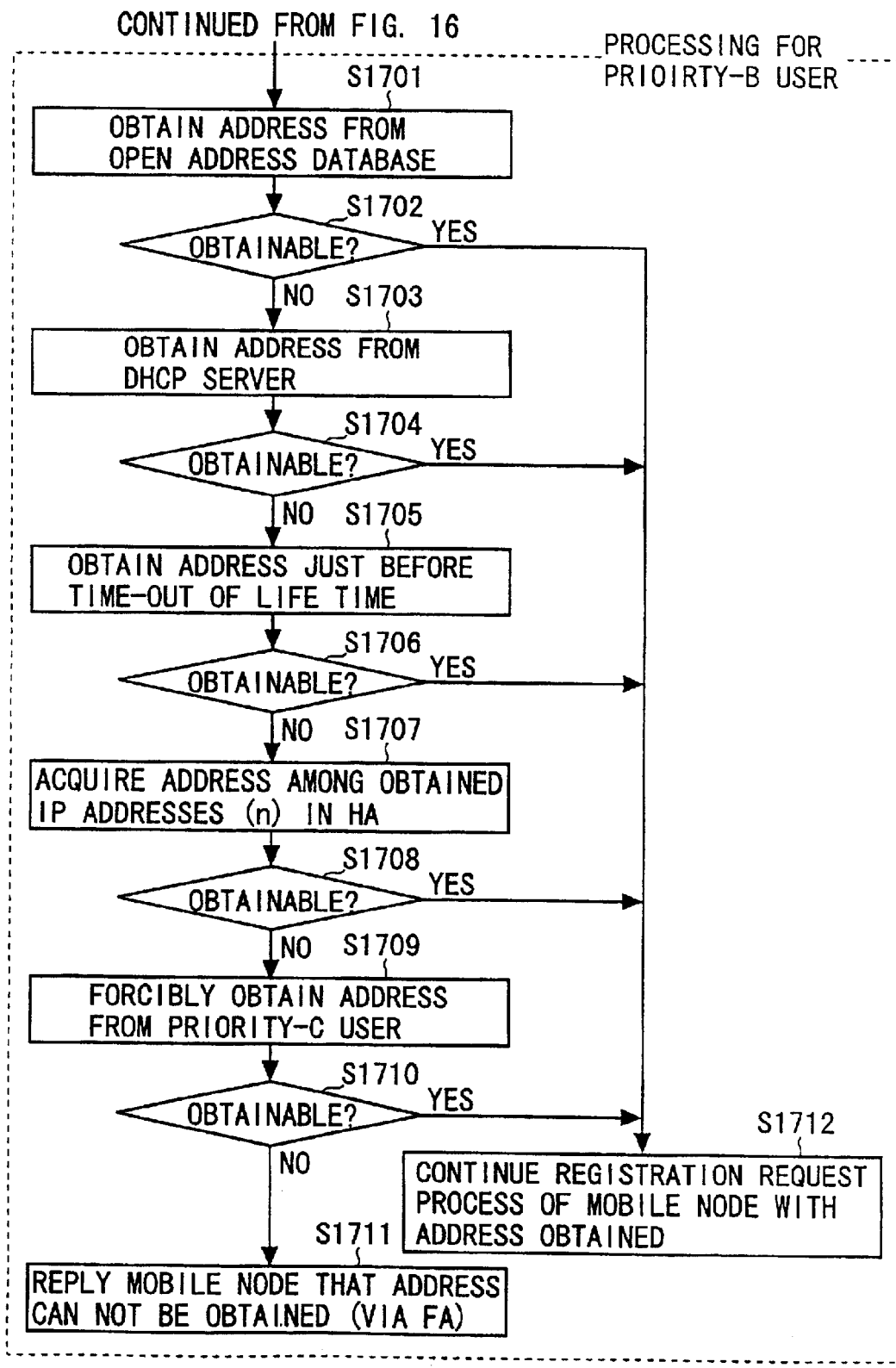
FIG. 17 is a flowchart showing steps of the address allocation management process in the home agent.
Figure 18:
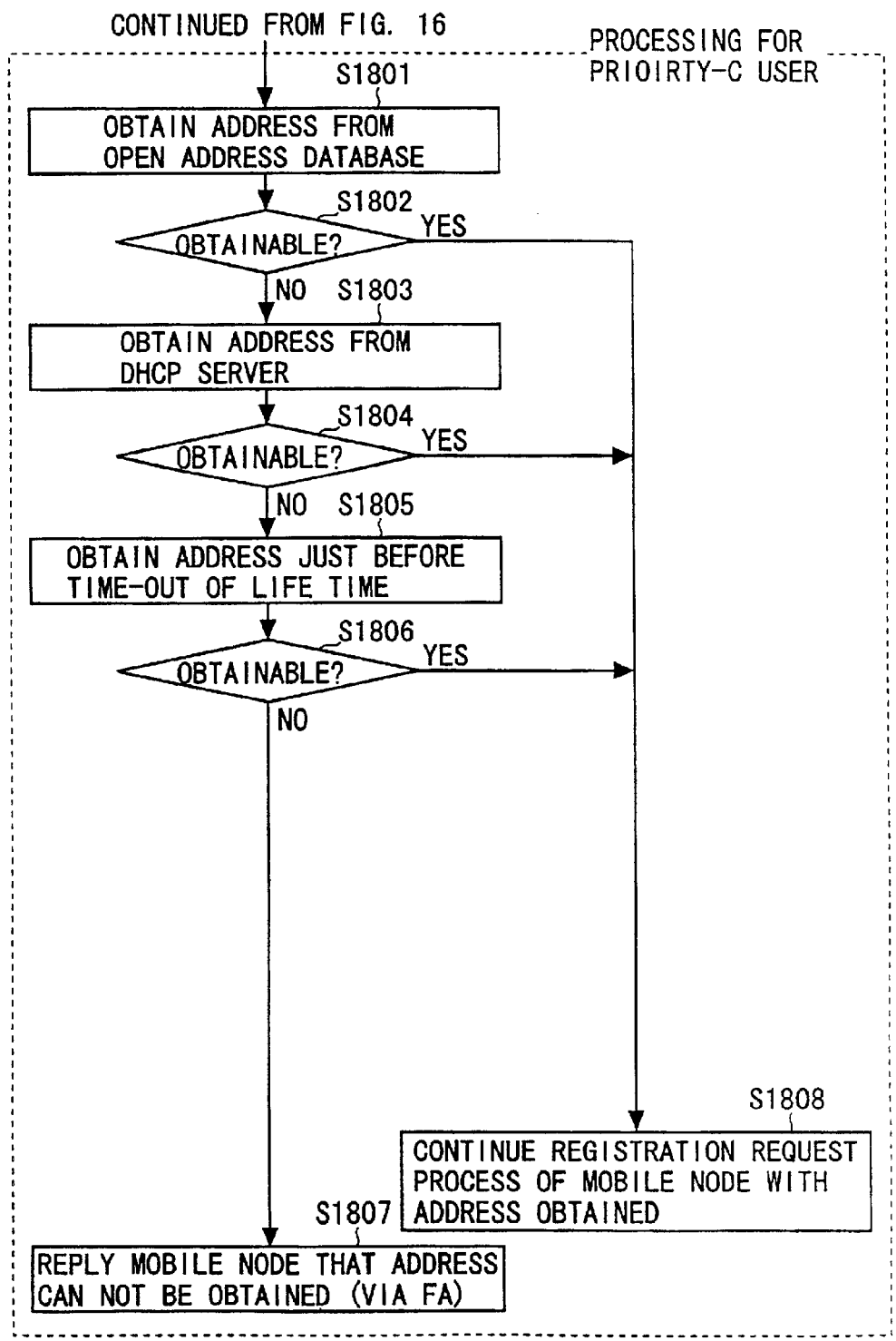
FIG. 18 is a flowchart showing steps of the address allocation management process in the home agent.

FIGS. 16, 17 and 18 are flowcharts showing procedures of an address allocation management process in the home agent 100.

Herein, the user priority is categorized into the three levels for simplifying the description, however, muchmore levels may also be set. Further, the priority rank is set such as the priority A>the priority B>the priority C in this example.

Namely, the implication is that the user given the priority A is a specified user (the specified user) having the top priority, the user given the priority B is the general user having the middle priority, and the user given the priority C is the user (allowed to access, e.g., free of charge as a trial) having the lowest priority. Moreover, it is assumed that the active user count be based on the relationship such as the priority A<the priority B>the priority C.

Referring first to FIGS. 1, 2 and 16, the home agent 100 in the home network system HNW in this mobile IP network system SYS previously registers the user information database 150 with mappings of the mobile node oriented user identifiers (MN-NAI) to the user priorities as a pre-preparation (processing step S1601) for executing the address allocation management process which will hereinafter be described.

Herein, as FIG. 3(A) shows the specific example, totally 15 users, i.e., five users (user identifiers: aaa1 to aaa5) given the priority A and ten users (user identifiers: bbb1 to bbb10) given the priority B, are registered beforehand in the user information database 150.

Further, the home agent 100, as the pre-preparation (S1601) obtains n-pieces of addresses (home agent HA acquisition addresses) allowing for a priority-A user count and an activity ratio from the DHCP server 200, and registers them beforehand in the priority address database 160.

Herein, five priority-A users are registered in the user information database 150, and hence, as FIG. 3(B) shows the specific example, IP addresses (aaa.aaa.aaa.aa1 through aaa.aaa.aaa.aa3) for three priority-A users are acquired and previously registered.

Each registration in this pre-preparation can be executed in such a way that an administrator of, e.g., the home network system HNW accesses the address management module 110 via the data transmitting/receiving module 140 from a maintenance terminal (unillustrated) connected to the home network 500.

The address management module 110 in the home agent 100 in the home network system HNW receives an address request (registration request) transmitted by the mobile data transmitting/receiving module 130 from the mobile node 400, then refers to the user information database 150, this reference being triggered by the registration request given from the mobile management module 120 notified of this receipt status from the mobile transmitting/receiving module 130, and makes a judgement about a mobile node oriented user priority of the user making the same registration request (S1602, S1603).

As a result of this judgement, in the case of the registration request given from the priority-A user (the specified user), the address management module 110 extracts the IP address (the HA acquisition address) from the priority address database 160 that has been previously reserved for the priority-A user, and notifies the mobile management module 120 of this extracted IP address (S1604).

If unable to extract the address in S1604 (S1605), the address management module 110 extracts the address from the open address database 170, and notifies the mobile management module 120 of this extracted address (S1606).

If unable to extract the address in S1606 (S1607), the address management module 110 extracts the address from the HDCP server 200, and notifies the mobile management module 120 of this extracted address (S1608).

If unable to extract the address in S1608 (S1609), the address management module 110 extracts the address that is on the verge of time-out of the life time LT from the mobile binding list 180, and notifies the mobile management module 120 of this extracted address (S1610). Note that a residual time obtained by a subtraction of the address management module 110 is always set in the "life time (LT)" field in the mobile binding list 180. The address just before the time-out of the life time (LT) has a high possibility of its being not what is normally disconnected but what is left as a residual.

If unable to extract the address in S1601 (S1611), the address management module 110 lists up the priority-C users (mobile nodes) receiving the mobile services on the basis of the mobile binding list 180 (see FIG. 12(D)), and notifies the mobile management module 120 of this list.

The mobile management module 120 rejects an update request of the mobile node 400 receiving a registration update among the mobile nodes 400 listed up in the notified list, and notifies the address management module 110 for the forcible acquisition. Further, the mobile management module 120 stops tunneling (forwarding of encapsulated IP packets) to the notified address.

The address management module 110 notifies the mobile management module 120 that the address notified from the mobile management module 120 is to be allocated to the priority-A user. At this time, an update request reject count is adjusted depending on how much a registration request queue count is. This adjusting method may involve a one-by-one adjustment or a (queue count+n-pieces) suite adjustment or an overall adjustment (S1612).

If unable to extract the address in S1612, i.e., if there is no priority-C user (S1613), the address management module 110 lists up addresses to be allocated to the priority-A users from the addresses for the priority-B users with reference to the mobile binding list 180, and notifies the mobile management module 120 of this list.

The mobile management module 120 rejects the update request of the mobile node 400 receiving the registration update among the mobile nodes 400 listed up in the notified list, and notifies the address management module 110 of an address of the rejected mobile node. Further, the mobile management module 120 stops tunneling to the notified address.

The address management module 110 notifies the mobile management module 120 that the address notified from the mobile management module 120 is to be allocated to the priority-A user (S1614).

If unable to extract the address in S1614 (S1615), the address management module 110 lists up the priority-B users (mobile nodes) receiving the mobile services on the basis of the mobile binding list 180, and notifies the mobile management module 120 of this list.

The mobile management module 120 rejects the update request of the mobile node 400 receiving the registration update among the mobile nodes 400 listed up in the notified list, and notifies the address management module 110 of an address of the rejected mobile node. Further, the mobile management module 120 stops tunneling to the notified address.

The address management module 110 notifies the mobile management module 120 that the address notified from the mobile management module 120 is to be allocated to the priority-A user. At this time, the update request reject count is adjusted depending on how much the registration request queue count is. This adjusting method may involve the one-by-one adjustment or the (queue count+n-pieces) suite adjustment or the overall adjustment (S1616).

If unable to extract the address in S1616 (S1617), it implies that all the addresses are used up for the allocations to priority-A users, and at this time the registration request for the mobile service is not rejected till it comes to this status. Namely, the home agent 100 gives the mobile node 400 a reply that the address can not be acquired via the foreign agent 300 and the foreign network 600 in the foreign network system FNW (S1618).

If able to extract the address in each of S1604, S1606, S1608, S1610, S1612, S1614 and S1616, the address management module 110 continues the registration request process with respect to the mobile node 400 on the basis of the address obtained (S1619).

Referring next to FIGS. 1, 2 and 17, as a result of the judgement about the registration requester mobile node oriented user priority (S1603 in FIG. 16), in the case of the registration request given from the priority-B user (the general user), the address management module 110 extracts the address from the open address database 170, and notifies the mobile management module 120 of this extracted address (S1701).

If unable to extract the address in S1701 (S1702), the address management module 110 extracts the address from the DHCP server 200, and notifies the mobile management module 120 of the extracted address (S1703).

If unable to extract the address in S1703 (S1704), the address management module 110 extracts the address just before the time-out of the life time LT from the mobile binding list 180, and notifies the mobile management module 120 of this extracted address (S1705).

If unable to extract the address in S1705 (S1706), the address management module 110 extracts the address (the HA acquisition address registered beforehand in the priority address database 160 in the pre-preparation) from the priority address database 160, i.e., leases the address for the priority-A user for the priority-B user, and notifies the mobile management module 120 of this extracted address (S1707).

If unable to extract the address in S1707 (S1708), the address management module 110 lists up the addresses of the priority-C users (mobile modes) receiving the mobile services on the basis of the mobile binding list 180, and notifies the mobile management module 120 of this list.

The mobile management module 120 rejects the update request of the mobile node receiving the registration update among the mobile nodes listed up in the notified list, and notifies the address management module 110 of an address of the rejected mobile node. Further, the mobile management module 120 stops tunneling to the notified address.

The address management module 110 notifies the mobile management module 120 that the address notified from the mobile management module 120 is to be allocated to the priority-B user. At this time, the update request reject count is adjusted in the same way as described above depending on how much the registration request queue count is (S1709).

If unable to extract the address in S1709 (S1710), it implies that all the addresses are used up for the allocations to priority-B users, and at this time the registration request for the mobile service is not rejected till it comes to this status. Namely, the home agent 100 gives the mobile node 400 a reply that the address can not be acquired via the foreign agent 300 and the foreign network 600 in the foreign network system FNW (S1711).

If able to extract the address in each of S1701, S1703, S1705, S1707 and S1709, the address management module 110 continues the registration request process with respect to the mobile node 400 on the basis of the address obtained (S1712).

Referring next to FIGS. 1, 2 and 18, as a result of the judgement about the registration requester mobile node oriented user priority (S1603 in FIG. 16), in the case of the registration request given from the priority-C user (the lowest priority user) the address management module 110 extracts the address from the open address database 170, and notifies the mobile management module 120 of this extracted address (S1801).

If unable to extract the address in S1801 (S1802), the address management module 110 extracts the address from the DHCP server 200, and notifies the mobile management module 120 of the extracted address (S1803).

If unable to extract the address in S1803 (S1804), the address management module 110 extracts the address just before the time-out of the life time LT from the mobile binding list 180, and notifies the mobile management module 120 of this extracted address (S1805).

If unable to extract the address in S1805 (S1806), it implies that all the addresses are used up for the allocations to priority-A and -B users, and at this time the registration request for the mobile service is not rejected till it comes to this status. Namely, the home agent 100 gives the mobile node 400 a reply that the address can not be acquired via the foreign agent 300 and the foreign network 600 in the foreign network system FNW (S1807).

If able to extract the address in each of S1801, S1803 and S1805, the address management module 110 continues the registration request process with respect to the mobile node 400 on the basis of the address obtained (S1808).

Figure 19A:
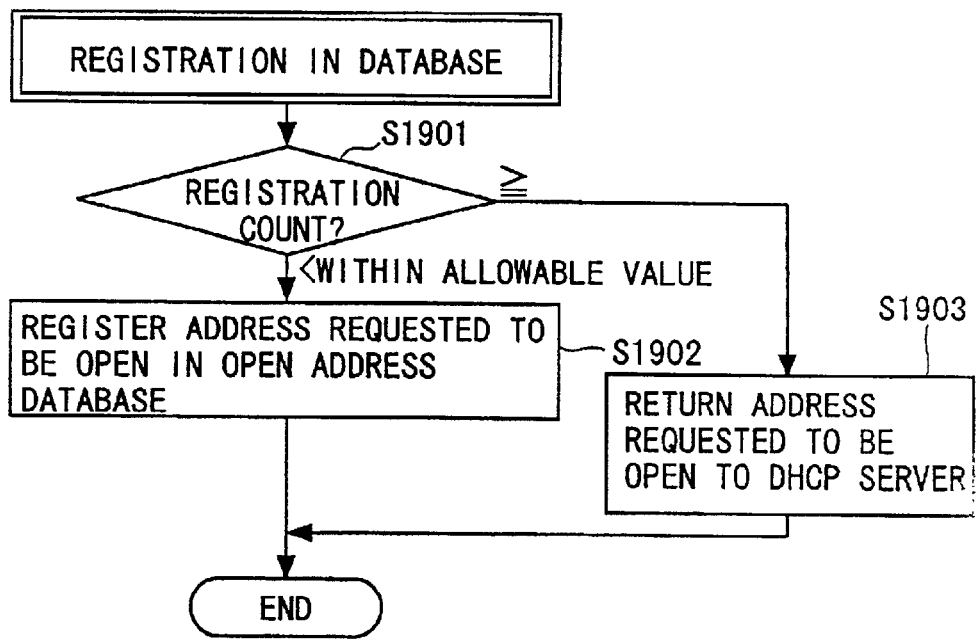
FIG. 19 is a flowchart showing steps of a management process for the open address database in the home agent.
Figure 19B:
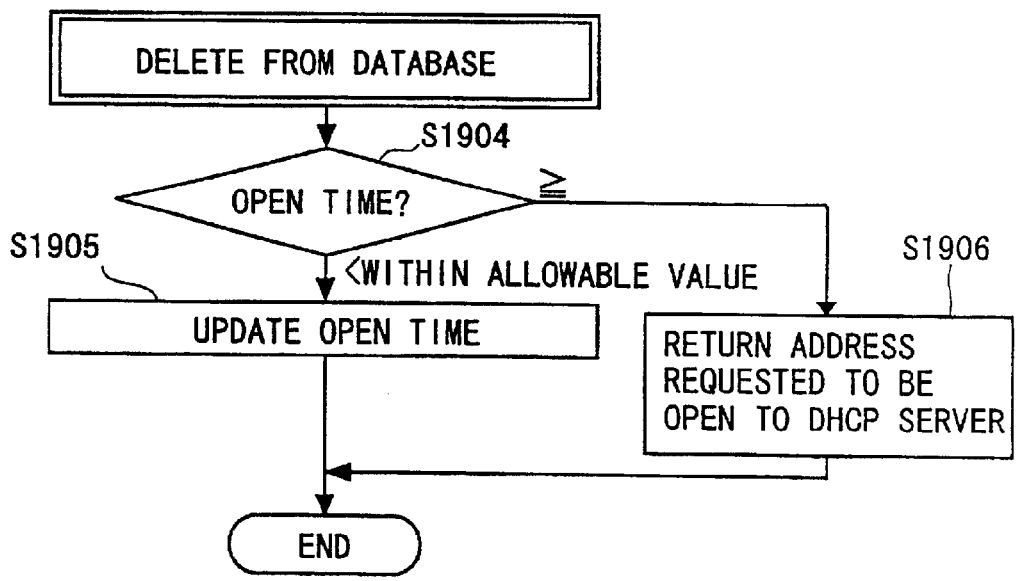

FIGS. 19(A) and 19(B) show one example of processing steps for temporarily pooling the addresses to be open in the address allocation management process described above, i.e., the addresses that must be returned to the HDCP server 200. Herein, the priority rank count and the processes (services to be provided can be set and carried out in multiple variations depending on how these elements are combined.

With respect to the addresses registered in the open address database 170, the addresses leased by the home agent 100 from the DHCP server 200 are administered.

If the address to be open is the priority address, the address management module 110 of the home agent 100 returns this address to the priority address database 160. This open address return process serves to reduce the access count to the DHCP server 200 and to relieve the IP traffic on the home network 500, and makes it possible to differentiate the priority-based address allocations.

As shown in FIG. 19(A), in the database registration process (S1901 through S1903), the address management module 110 of the home agent 100 registers the open address database 170 with the address used so far by the user corresponding to the open-requester mobile node, this registration being triggered by the address open (request) via the mobile management module 120.

At this time, an allowable value (limit value) of the registerable address count is set in the open address database 170. If over the limit value, the address management module 110 returns the address concerned to the DHCP server 200.

Further, the address management module 110, when registering the open request address in the open address database 170, sets the open time (the effective time) and the forced delete ranks.

As shown in FIG. 19(B), in the database delete process (S1904 to S1906), the address management module 110 of the home agent 100 periodically manages the address open time registered in the open address database 170 on the basis of the allowable value. The address management module 110, when the open time expires, returns the address concerned to the DHCP server 200.

Figure 20:
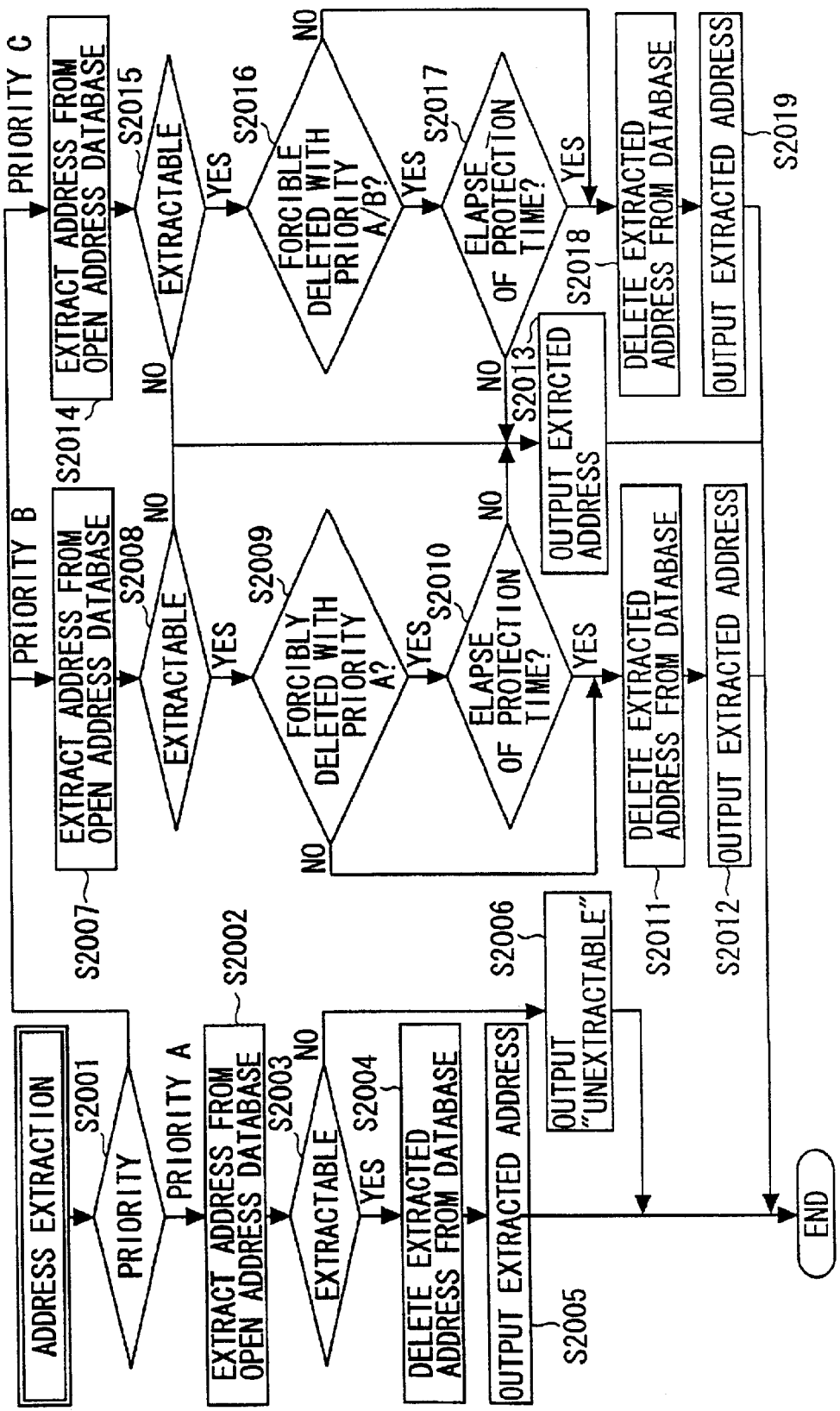
FIG. 20 is a flowchart showing steps of the management process for the open address database in the home agent.
Figure 21A:
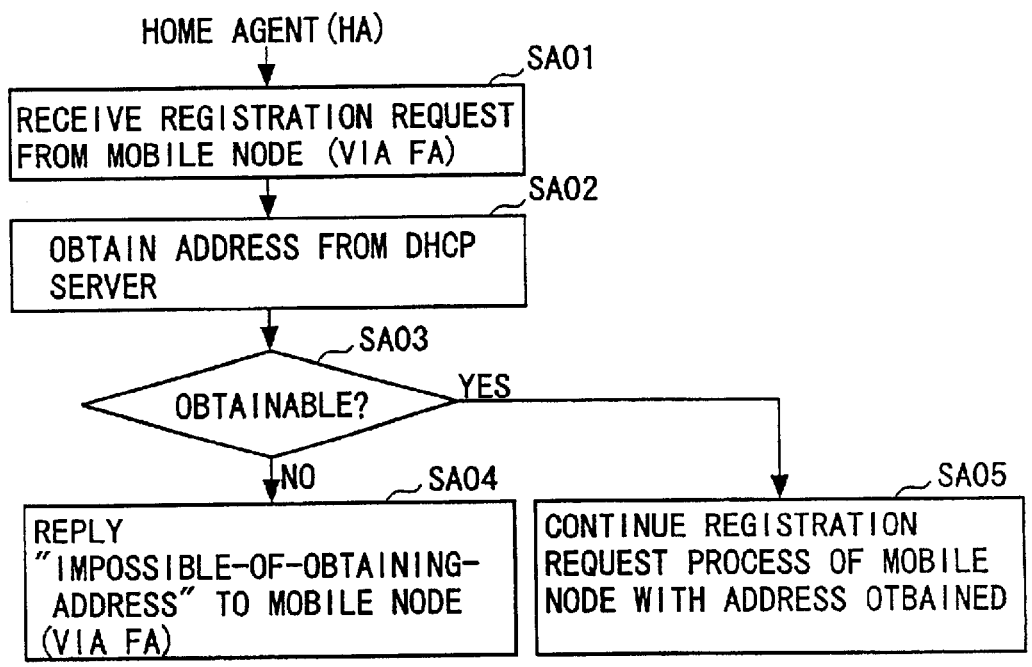
FIG. 21 is an explanatory flowchart showing steps of an address allocation management process in a conventional mobile IP network system.
Figure 21B:
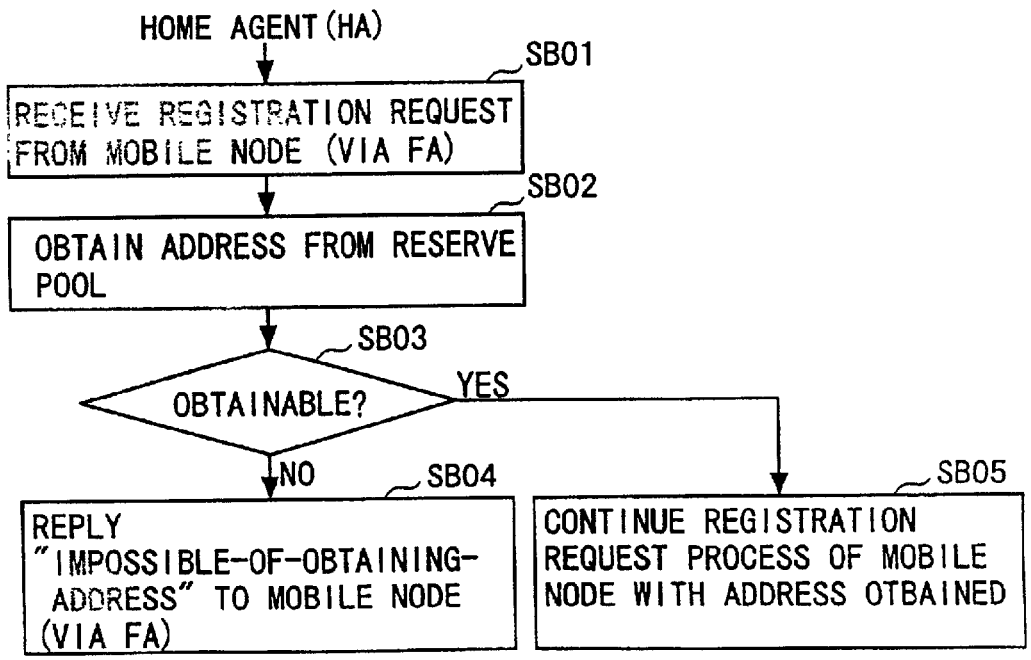

As shown in FIG. 20, in the address extraction process, the address management module 110 refers to the user information database 150, this reference being triggered by the address request given from the mobile management module 120, and makes a judgement about the priority of the user as a registration requester (S2001).

As a result of the priority judgement, in the case of the registration request given from the priority-A user, the address management module 110 extracts the address from the open address database 170 (S2002).

The address management module 110 deletes this extracted address from the database 170, and sets the extracted address in the "extraction result", i.e., outputs the extracted address (S2003 to S2005). If unable to extract the address in S2002, the address management module 110 sets [unextractable] in the "extraction result" (S2006).

As a result of the priority judgement in S2001, in the case of the registration request given from the priority-B user, the address management module 110 extracts the address from the open address database 170 (S2007).

The address management module 110 detects a forced delete rank of the extracted address, and judges whether the address is an address forcibly acquired for the allocation to the priority-A user. The address management module 110, when judging that the address is the forcibly acquired address, deletes this address from the database 170 if its open time detected proves over the protection time, and sets the extracted address in the "extraction result" (S2008 to S2012). If unable to extract the address in S2007, the address management module 110 sets [unextractable] in the "extraction result" (S2013).

Further, as a result of the priority judgement in S2001, in the case of the registration request given from the priority-C user, the address management module 110 extracts the address from the open address database 170 (S2014).

The address management module 110 detects a forced delete rank of the extracted address, and judges whether the address is an address forcibly acquired for the allocation to the priority-A or -C user. The address management module 110, when judging that the address is the forcibly acquired address, deletes this address from the database 170 if its open time detected proves over the protection time, and sets the extracted address in the "extraction result" (S2015 to S2019). If unable to extract the address in S2014, the address management module 110 sets [unextractable] in the "extraction result" (S2013)

[Modified Example]

The processes in one embodiment discussed above can be actualized as a program executable by a computer, and this program can be recorded on recording mediums such as a CD-ROM, a floppy disk and so on and further can be distributed via a communication line.

Moreover, an arbitrary plurality of or all the processes in one embodiment may be selectively combined and thus executed.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A home agent connected to a first network and providing mobility transparent communications to a mobile node temporarily connected to a second network as a mobile destination different from said first network which is normally utilized, said home agent comprising:
    a module receiving a new registration request from said mobile node via said second network;
    a module detecting, when receiving the new registration request, that lease addresses of a DHCP server and addresses pooled beforehand are all occupied, wherein said DHCP server is connected said home agent via said first network and is an address lender;
    a module searching for, when detecting that all the addresses are occupied, an address on the basis of self-managed information and allocating the searched address to said mobile node; and
    a module temporarily pooling as the self-managed information the address requested to be opened by said mobile node without immediately returning the address to said DHCP server.

2. A home agent according to claim 1, further comprising a module allocating the temporarily pooled address to said mobile node making the new registration request.

3. A home agent according to claim 1, further comprising a module extracting as the self managed information an address just before time-out of a life time and allocating this extracted address to said mobile node making the new registration request.

4. A home agent according to claim 3, wherein the address just before the time-out of the life time is extracted from a mobile binding list.

5. A home agent according to claim 1, further comprising a module administering as the self-managed information address allocation priorities of users corresponding to said mobile nodes.

6. A home agent according to claim 5, further comprising a module, when the new registration request is given from said mobile node used by a higher priority user, extracting a lower priority user, stopping providing a mobile service to the extracted user, and allocating an address used by the extracted user to said mobile node making the new registration request.

7. A home agent according to claim 5, further comprising a module extracting, when the new registration request is given from said mobile node used by a higher priority user, all lower priority users, and stopping providing mobile services to all the lower priority users extracted.

8. A home agent according to claim 6, further comprising a module temporarily pooling the address used by the user stopped from receiving the mobile service without immediately returning the same address to said DHCP server.

9. An address allocation management method in a home agent connected to a first network and providing mobility transparent communications to a mobile node temporarily connected to a second network as a mobile destination different from said first network normally which is utilized, said method comprising:
    receiving a new registration request from said mobile node via said second network;

detecting, when receiving the new registration request, that lease addresses of a DHCP server and addresses pooled beforehand are all occupied, wherein said DHCP server is connected said home agent via said first network and is an address lender;

searching for, when detecting that all the addresses are occupied, an address on the basis of self-managed information and allocating the searched address to said mobile node; and temporarily pooling as the self-managed information the address requested to be opened by said mobile node without immediately returning the address to said DHCP server.

10. An address allocation management method according to claim 9, further comprising allocating the temporarily pooled address to said mobile node making the new registration request.

11. An address allocation management method according to claim 9, further comprising extracting as the self-managed information an address just before time-out of a life time and allocating this extracted address to said mobile node making the new registration request.

12. An address allocation management method according to claim 11, wherein the address just before the time-out of the lifetime as extracted from a mobile binding list.

13. An address allocation management method according to claim 9, further comprising administering as the self-managed information address allocation priorities of users corresponding to said mobile nodes.

14. An address allocation management method according to claim 13, further comprising, when the new registration request is given from said mobile node used by a higher priority user, extracting a lower priority user, stopping providing a mobile service to the extracted user, and allocating an address used by the extracted user to said mobile node making the new registration request.

15. An address allocation management method according to claim 13, further comprising extracting, when the new registration request is given from said mobile node used by a higher priority user, all lower priority users, and stopping providing mobile services to all the lower priority users extracted.

16. An address allocation management method according to claim 14, further comprising temporarily pooling the address used by the user stopped from receiving the mobile service without immediately returning the same address to said DHCP server.

17. A home agent for transferring a packet for mobile-IP, comprising:

a first module receiving a registration request from a mobile node via a mobile-IP network;

a second module allocating an IP address to said mobile node, said IP address being selected from one of a DHCP server, a first pool storing IP addresses, and a second pool storing IP addresses; and a third module storing an IP address released from the mobile node in the second pool for a predetermined period of time.

* * * * *